United States Patent
Kumabe

(10) Patent No.: US 9,742,899 B2
(45) Date of Patent: Aug. 22, 2017

(54) ELECTRONIC CONTROL APPARATUS

(71) Applicant: DENSO CORPORATION, Kariya, Aichi-pref. (JP)

(72) Inventor: Seigou Kumabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/036,705

(22) PCT Filed: Oct. 22, 2014

(86) PCT No.: PCT/JP2014/005359
§ 371 (c)(1),
(2) Date: May 13, 2016

(87) PCT Pub. No.: WO2015/075867
PCT Pub. Date: May 28, 2015

(65) Prior Publication Data
US 2016/0352889 A1    Dec. 1, 2016

(30) Foreign Application Priority Data
Nov. 19, 2013  (JP) .................................. 2013-239171

(51) Int. Cl.
H04M 1/00     (2006.01)
H04M 1/725    (2006.01)
(Continued)

(52) U.S. Cl.
CPC ......... *H04M 1/72533* (2013.01); *B60R 21/00* (2013.01); *G06F 9/48* (2013.01);
(Continued)

(58) Field of Classification Search
CPC ..... G01C 21/26; G01C 21/3469; H04L 67/12; H04L 67/2814; H04W 4/046
See application file for complete search history.

(56) References Cited

U.S. PATENT DOCUMENTS 7,557,459 B2 *  7/2009  Yamashita ................ B60L 1/00
                                                      307/9.1
8,380,413 B2 *  2/2013  Smith .................... B60T 13/665
                                                      246/187 C
(Continued)

FOREIGN PATENT DOCUMENTS

JP    2003217074 A    7/2003
JP    2003319461 A   11/2003
(Continued)

OTHER PUBLICATIONS

International Search Report and Written Opinion (in Japanese with English Translation) for PCT/JP2014/005359, mailed Jan. 13, 2015; ISA/JP.

*Primary Examiner* — Edward Urban
*Assistant Examiner* — Max Mathew
(74) *Attorney, Agent, or Firm* — Harness, Dickey & Pierce, P.L.C.

(57) ABSTRACT

In an electronic control apparatus, a wireless data control section includes a wireless data reception section that moves wireless data stored in a first wireless data storage unit to an intermediate wireless data storage unit, and a wireless data management section that moves the wireless data stored in the intermediate wireless data storage unit to a second wireless data storage unit. An in-vehicle data control section includes an in-vehicle data reception section that moves in-vehicle data stored in a first in-vehicle data storage unit to an intermediate in-vehicle data storage unit. Herein, a process performed by the wireless data reception section takes precedence over a process performed by the in-vehicle data reception section and over a process performed by the wireless data management section.

17 Claims, 4 Drawing Sheets

(51) Int. Cl.
  *H04L 29/08*    (2006.01)
  *G08G 1/09*     (2006.01)
  *G08G 1/16*     (2006.01)
  *G06F 9/48*     (2006.01)
  *B60R 21/00*    (2006.01)
  *H04L 13/08*    (2006.01)
  *H04B 1/3822*   (2015.01)

(52) U.S. Cl.
  CPC .......... *G06F 9/4887* (2013.01); *G08G 1/093* (2013.01); *G08G 1/163* (2013.01); *H04B 1/3822* (2013.01); *H04L 13/08* (2013.01); *H04L 67/12* (2013.01); *H04L 67/2842* (2013.01)

(56) References Cited

U.S. PATENT DOCUMENTS

| | | | | |
|---|---|---|---|---|
| 2005/0080606 | A1* | 4/2005 | Ampunan | G01M 17/007 703/8 |
| 2007/0279200 | A1* | 12/2007 | Morimoto | G06Q 50/10 340/436 |
| 2008/0192742 | A1 | 8/2008 | Kobayashi et al. | |
| 2013/0185072 | A1* | 7/2013 | Huang | G10L 15/30 704/246 |
| 2014/0139354 | A1* | 5/2014 | Miyazaki | B60L 11/1816 340/902 |
| 2015/0040113 | A1* | 2/2015 | Muench-Casanova | G06F 9/4406 717/168 |
| 2015/0217706 | A1* | 8/2015 | Nishiyama | B60R 16/023 710/314 |
| 2015/0293702 | A1* | 10/2015 | Fujimori | G06F 3/0604 711/154 |
| 2015/0307041 | A1* | 10/2015 | Hirano | B60R 16/03 307/10.1 |
| 2016/0267335 | A1* | 9/2016 | Hampiholi | G06F 3/013 |

FOREIGN PATENT DOCUMENTS

| | | |
|---|---|---|
| JP | 2007109032 A | 4/2007 |
| JP | 2009009486 A | 1/2009 |
| JP | 2009123083 A | 6/2009 |
| JP | 2012204931 A | 10/2012 |
| JP | 2013210977 A | 10/2013 |
| WO | WO-2007010898 A1 | 1/2007 |
| WO | WO-2011013708 A1 | 2/2011 |

\* cited by examiner

FIG. 5

<TASK PRIORITIES>

HIGH ↑ / LOW ↓

| PRIORITY | TASK | EXECUTE |
|---|---|---|
| 1 | MIDDLEWARE SYSTEM CONTROL | MIDDLEWARE SYSTEM CONTROL SECTION |
| 2 | WIRELESS DATA RECEIVE | WIRELESS DATA RECEPTION SECTION |
| 3 | IN-VEHICLE DATA RECEIVE | IN-VEHICLE DATA RECEPTION SECTION |
| 4 | IN-VEHICLE DATA MANAGE | IN-VEHICLE DATA MANAGEMENT SECTION |
| 5 | GPS DATA MANAGE | GPS DATA CONTROL SECTION |
| 6 | WIRELESS DATA MANAGE | WIRELESS DATA MANAGEMENT SECTION |
| 7 | APPLICATION DATA GENERATE | APPLICATION DATA GENERATION SECTION |
| ⋮ | ⋮ | ⋮ |

FIG. 6

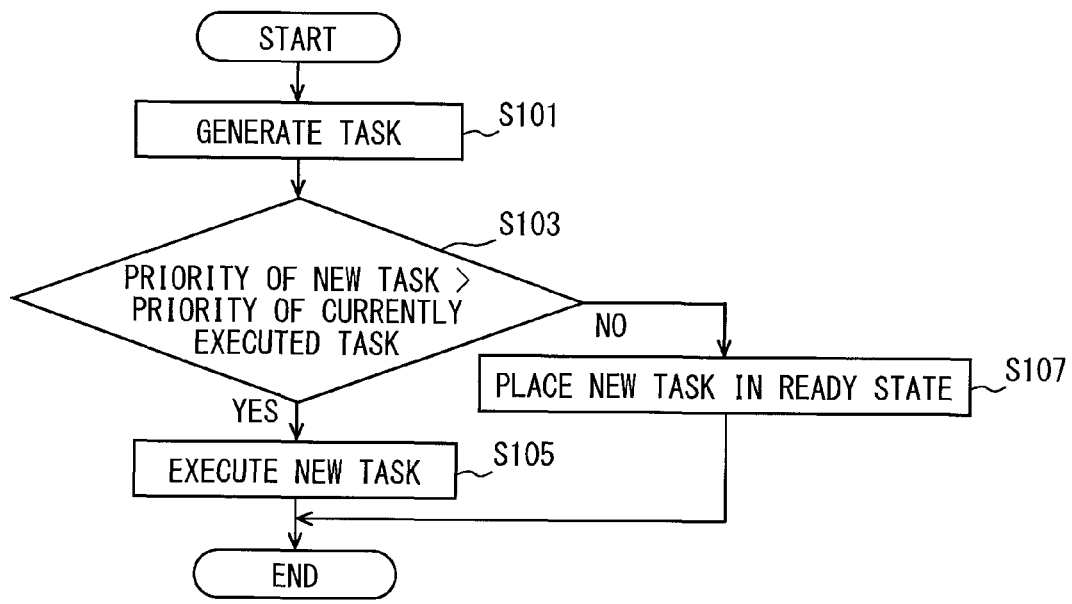

ELECTRONIC CONTROL APPARATUS

CROSS REFERENCE TO RELATED APPLICATIONS

This application is a U.S. National Phase Application under 35 U.S.C. 371 of International Application No. PCT/JP2014/005359 filed on Oct. 22, 2014 and published in Japanese as WO 2015/075867 A1 on May 28, 2015. This application is based on and claims the benefit of priority from Japanese Patent Application No. 2013-239171 filed on Nov. 19, 2013. The entire disclosures of all of the above applications are incorporated herein by reference.

TECHNICAL FIELD

The present disclosure relates to an electronic control apparatus for a vehicle.

BACKGROUND ART

There is proposed an electronic control apparatus performing various control processes based on data that a radio for vehicle-to-vehicle communication and road-to-vehicle communication receives from a different vehicle and a roadside unit (the data is referred to as radio data or wireless data). This type of electronic control apparatus is mainly formed of a well-known microcomputer including a CPU, a RAM, and a ROM. Programs (applications) related to the various control processes are stored in the ROM or other nonvolatile memory.

In addition to the wireless data, this type of electronic control apparatus also inputs data indicative of vehicle status (referred to as in-vehicle data), which is outputted from in-vehicle instruments such as an in-vehicle sensor and another electronic control apparatus. That is, the electronic control apparatus performs various control processes by using the wireless data and in-vehicle data.

An electronic control apparatus in Patent Literature 1 uses the wireless data and in-vehicle data to perform a plurality of control processes in order to assist a user in driving a vehicle. More specifically, a radio media receiver (that is, a radio) successively receives infrastructure information (that is, wireless data) transmitted from a roadside unit and successively outputs the wireless data to the electronic control apparatus. The wireless data includes traffic light information indicative of a traffic light color, oncoming vehicle information indicative of the presence of an oncoming vehicle, and pedestrian information indicative of the presence of a pedestrian. Further, the electronic control apparatus successively receives various in-vehicle data from in-vehicle instruments through an in-vehicle network built in a vehicle.

From the wireless data and in-vehicle data, the electronic control apparatus generates data necessary for control processes (the data is referred to as the control data). The electronic control apparatus then performs a control process based on the generated control data and applications.

PRIOR ART LITERATURES

Patent Literature

Patent Literature 1: JP 2013-210977 A

SUMMARY OF INVENTION

In general, the microcomputer includes software such as a control section (a so-called device driver), applications, and middleware. The control section controls instruments connected to the microcomputer. The applications handle various control processes. The middleware is positioned midway between a driver and an application.

A function of generating the aforementioned control data (this function is referred to as the control data generation section) is incorporated, e.g., in the middleware. The instruments connected to the microcomputer may be simply referred to as the connected instruments such as a radio, an in-vehicle instrument.

The microcomputer includes a control section for each connected instrument. More specifically, the microcomputer includes software such as a radio control section for a radio and an in-vehicle communication control section for an in-vehicle instrument. The RAM is configured so that predetermined storage areas (so-called buffers) are allocated to the radio control section, the in-vehicle communication control section, and the control data generation section. These buffers are respectively referred to as the radio control section buffer, the in-vehicle communication control section buffer, and the data generation section buffer.

When data is inputted from an associated connected instrument, a control section temporarily stores and retains the inputted data in a buffer allocated to the control section. At predetermined intervals or at a predetermined time point, the control data generation section moves the data retained in the buffer for each control section to the data generation section buffer, which is allocated to the control data generation section, and then generates control data.

Buffers allocated to device drivers, such as the radio control section buffer and the in-vehicle communication control section buffer, are generally smaller in size than buffers allocated to middleware and applications. The wireless data, which is derived from vehicle-to-vehicle communication and road-to-vehicle communication, includes various information. Thus, the wireless data received during a single communication session is larger in size than the radio control section buffer. Therefore, the radio control section buffer may be filled with the wireless data before the control data generation section frees the radio control section buffer by moving the data stored in it.

The in-vehicle data is not as large in size as the wireless data; meanwhile, the in-vehicle data is received at relatively frequent intervals. Therefore, the in-vehicle communication control section buffer is also likely to be filled with the in-vehicle data.

When the buffer for a control section is full, the control section cannot store new data received from a connected instrument and discards the newly received data. If the newly received data is discarded, it is obvious that the content of the newly received data will not be reflected in the control data. Therefore, the data should not be discarded.

In particular, the wireless data is received from a dynamically changing communications partner, giving no guarantee that the same data will be subsequently acquired. This leads to a demand to avoid the discard of wireless data wherever possible.

It is an object of the present disclosure to provide an electronic control apparatus that reduces the possibility of losing wireless data acquired through a radio due to a full radio control section buffer.

In accomplishing the above object, according to one aspect of the present disclosure, there is provided an electronic control apparatus that is mounted in a vehicle and used to perform a control process based on wireless data and in-vehicle data. The wireless data is received by a radio that establishes wireless communication with at least one of a different vehicle and a roadside unit. The in-vehicle data is generated by an in-vehicle instrument disposed in the vehicle. The electronic control apparatus includes a radio control section, an in-vehicle communication control section, a wireless data control section, an in-vehicle data control section, and a control data generation section. The radio control section stores the wireless data inputted from the radio in a first wireless data storage unit. The in-vehicle communication control section stores the in-vehicle data inputted from the in-vehicle instrument in a first in-vehicle data storage unit. The wireless data control section stores the wireless data, which is stored in the first wireless data storage unit, in a second wireless data storage unit. The in-vehicle data control section stores the in-vehicle data, which is stored in the first in-vehicle data storage unit, in a second in-vehicle data storage unit. The control data generation section generates control data, which is necessary for performing the control process, from the wireless data stored in the second wireless data storage unit and the in-vehicle data stored in the second in-vehicle data storage unit. The wireless data control section includes a wireless data reception section and a wireless data management section. The wireless data reception section moves the wireless data stored in the first wireless data storage unit to an intermediate wireless data storage unit. The wireless data management section moves the wireless data stored in the intermediate wireless data storage unit to the second wireless data storage unit. The in-vehicle data control section includes an in-vehicle data reception section that moves the in-vehicle data stored in the first in-vehicle data storage unit to an intermediate in-vehicle data storage unit. Herein, priority is given to a process performed by the wireless data reception section over a process performed by the in-vehicle data reception section and over a process performed by the wireless data management section.

The above-described configuration causes the wireless data reception section to move the wireless data stored in the first wireless data storage unit to the intermediate wireless data storage unit. Further, the above-described configuration causes the in-vehicle data reception section to move the in-vehicle data stored in the first in-vehicle data storage unit to the intermediate in-vehicle data storage unit. In this instance, the process performed by the wireless data reception section takes precedence over the process performed by the in-vehicle data reception section and the process performed by the wireless data management section. More specifically, the process of moving the wireless data stored in the first wireless data storage unit to the intermediate wireless data storage unit takes precedence over the other processes.

The configuration thus reduces the possibility of the first wireless data storage unit being filled with the wireless data; namely, this reduces the possibility of losing the wireless data due to a full radio control section buffer (that is, the first wireless data storage unit).

Further, the in-vehicle data is also sequentially moved from the first in-vehicle data storage unit to the intermediate in-vehicle data storage unit. Thus, an in-vehicle communication control section buffer is unlikely to be filled. This reduces the possibility of losing the in-vehicle data.

BRIEF DESCRIPTION OF DRAWINGS

The above and other objects, features, and advantages of the present disclosure will become more apparent from the following detailed description made with reference to the accompanying drawings. In the drawings:

FIG. 5 is a diagram illustrating exemplary priorities assigned to individual tasks; and FIG. 6 is a flowchart illustrating a task generation process performed by a task management section.

DESCRIPTION OF EMBODIMENTS

Figure 1:
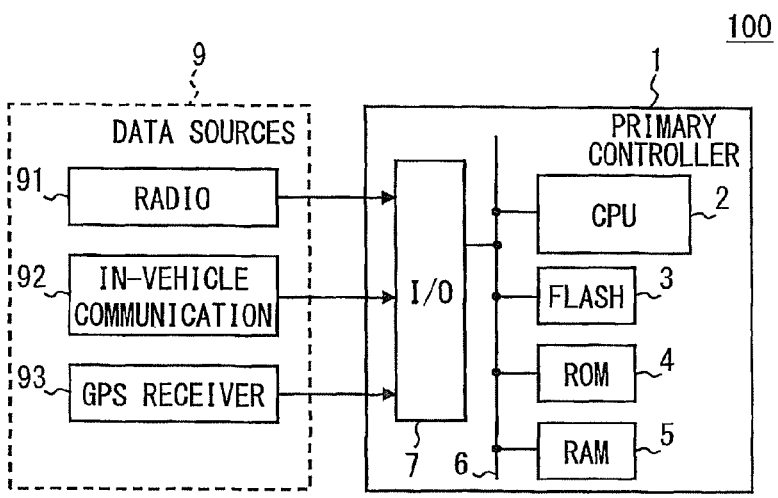
FIG. 1 is a schematic block diagram illustrating an exemplary configuration of an electronic control system according to an embodiment.

An exemplary embodiment of the present disclosure will now be described with reference to the accompanying drawings. FIG. 1 is a schematic diagram illustrating an exemplary configuration of an electronic control system 100 according to the embodiment, which is to be mounted in a vehicle (hereinafter may be referred to as the host vehicle). As in FIG. 1, the electronic control system 100 includes a primary controller 1 and various data sources 9. The various data resources 9 include a radio 91, an in-vehicle communication microcomputer 92, and a GPS receiver 93.

The radio 91, the in-vehicle communication microcomputer 92, and the GPS receiver 93 are intercommunicatively connected to the primary controller 1. The data sources 9 may have any configuration as far as later-described wireless data and in-vehicle data are inputted to the primary controller 1. The number of data sources 9, the types of data source instruments, and the configuration of data source circuits may be determined as desired. The primary controller 1 is also referred to as the electronic control apparatus.

The radio 91 is a wireless communication apparatus that provides either or both of vehicle-to-vehicle communication and road-to-vehicle communication. Data (wireless data) received by a reception antenna attached to the radio 91 is outputted to the primary controller 1. The wireless data includes vehicle-vehicle reception data and road-vehicle reception data. The vehicle-vehicle reception data is received from a different vehicle through vehicle-to-vehicle communication. The road-vehicle reception data is received from a roadside unit through road-to-vehicle communication. Vehicle-to-vehicle communication and road-to-vehicle communication are both established by a broadcast method.

The vehicle-vehicle reception data includes a source vehicle identification number, a destination vehicle identification number, and vehicle status information. The source vehicle identification number is used to distinguish a source vehicle from a different vehicle. The destination vehicle identification number is used to distinguish a destination vehicle from a different vehicle. The vehicle status information indicates the status of the source vehicle. The vehicle status information includes the current location, traveling speed, traveling direction, blinker switch on/off state, and brake lamp illumination of the source vehicle. That is, the vehicle-vehicle reception data includes various information about a different vehicle that has transmitted the data.

The road-vehicle reception data may be generated by the roadside unit or transmitted from a different vehicle existing in a communication area of the roadside unit. The latter vehicle-to-vehicle communication established through the roadside unit is also referred to as vehicle-road-vehicle communication. The road-vehicle reception data acquired from the roadside unit providing vehicle-road-vehicle communication includes the same content as the aforementioned vehicle-vehicle reception data.

Data generated by the roadside unit except for data handled by vehicle-road-vehicle communication is, e.g., traffic condition data indicative of traffic conditions prevailing in the periphery of the roadside unit. The traffic condition data indicates, e.g., traffic congestion and the presence of vehicles, pedestrians, and obstacles in a driver's blind spot in an area in the periphery of the roadside unit. The area in the periphery of the roadside unit may be within a range that is designed as appropriate with reference to the location of the roadside unit. If the traffic condition data indicates the presence of pedestrians, the data may relate to pedestrians with a distance of 20 m. As above, the road-vehicle reception data also includes various information such as the information about vehicles existing in the periphery of the roadside unit and traffic conditions prevailing in the periphery of the roadside unit.

As mentioned, upon receipt of vehicle-vehicle reception data or road-vehicle reception data, the radio 91 successively outputs the received data to the primary controller 1 as wireless data. The frequency with which the wireless data is outputted from the radio 91 to the primary controller 1 varies with the number of different vehicles that exist in the periphery of the host vehicle and establish vehicle-to-vehicle communication with the host vehicle (these different vehicles are also referred to as periphery vehicles) and the number of roadside units that establish road-to-vehicle communication with the host vehicle. Note that the wireless data include various information as mentioned; thus, a single data string of the wireless data, which is longer than later-described GPS data, may have a data size ranging from 100 bytes up to 1000 bytes.

The above-mentioned periphery of the host vehicle denotes a communication area formed by the radio 91. For example, the periphery of the host vehicle is up to 200 m ahead of the host vehicle, 100 m behind the host vehicle, and 100 m lateral to the host vehicle. The periphery vehicles and roadside units transmit vehicle-vehicle reception data and road-vehicle reception data, respectively, at predetermined transmission intervals (e.g., at 100-ms intervals). If the radio 91 is capable of receiving the wireless data from each of up to P different vehicles and up to Q roadside units, the radio 91 receives data transmitted from up to P+Q transmission sources during one transmission interval. If P=200 and Q=8, the radio 91 receives vehicle-vehicle reception data and road-vehicle reception data from 208 transmission sources during a period of 100 ms and successively outputs the received data to the primary controller 1.

The in-vehicle communication microcomputer 92 is a well-known microcomputer and intercommunicatively connected to the other ECUs and sensors mounted in the vehicle (these instruments are referred to as the in-vehicle instruments). The in-vehicle communication microcomputer 92 acquires data from these in-vehicle instruments (the data is referred to as the in-vehicle data) and successively outputs the acquired data to the primary controller 1.

The in-vehicle instruments are, e.g., a well-known vehicle speed sensor, acceleration sensor, gyro sensor, steering angle sensor, brake sensor, shift position sensor, body ECU, and steering ECU (unshown). The steering angle sensor detects the rotation angle of a steering wheel (that is, the steering angle). The body ECU controls, e.g., a door lock/unlock operation. The steering ECU controls the steering angle and steering reaction force by driving an electric power steering apparatus (unshown).

The in-vehicle data, which is outputted from each in-vehicle instrument, includes, e.g., a traveling speed, an acceleration detected by a G sensor, a rotational angular speed detected by the gyro sensor, the amount of brake pedal depression detected by the brake sensor, and a blinker switch on/off state. The in-vehicle data is generated by the in-vehicle instruments to indicate the status of the host vehicle.

The speed of communication between the in-vehicle communication microcomputer 92 and the primary controller 1 is, e.g., 512 kbps while varying depending on the specifications for a network connecting the in-vehicle communication microcomputer 92 and the primary controller 1. The in-vehicle communication microcomputer 92 acquires data that is asynchronously transmitted from various in-vehicle instruments. The primary controller 1 thus receives in-vehicle data from the in-vehicle communication microcomputer 92 at short intervals; the amount of data received per unit time is relatively large.

The GPS receiver 93 acquires data (GPS data) indicative of its current location by receiving a GPS radio wave transmitted from a satellite used in a GPS (Global Positioning System). The current location is expressed, e.g., by latitude and longitude. A GNSS (Global Navigation Satellite System) receiver may be incorporated in place of the GPS receiver 93. The GNSS receiver acquires data indicative of a current location by receiving a radio wave from a satellite used in a GNSS.

The GPS receiver 93 receives a GPS radio wave at intervals of approximately 100 ms, for example. The data carried by such a GPS radio wave is not as large in size as the wireless data. Therefore, the amount of data inputted from the GPS receiver 93 to the primary controller 1 per unit time is smaller than the amount of data inputted from the radio 91 and the in-vehicle communication microcomputer 92 per unit time.

The primary controller 1, which is a well-known microcomputer, performs control processes for electronic instruments mounted in the host vehicle on the basis of data inputted from the data sources 9 and of predetermined application software (hereinafter simply referred to as an application).

The control processes performed by the primary controller 1 include, e.g., a well-known ACC (Adaptive Cruise Control) process, a collision mitigation braking process, and an LKA (Lane Keeping Assist) process. The ACC process is implemented by controlling a drive system and a brake system so as to maintain a constant distance from a preceding vehicle. When the LKA process is to be performed, control target values, such as a steering angle and a steering amount, are outputted to the steering ECU.

The hardware configuration of the primary controller 1 is illustrated in FIG. 1. More specifically, the primary controller 1 includes a CPU 2, a flash memory 3, a ROM 4, a RAM 5, an input/output port (referred to as the I/O port) 7, and a bus 6 that interconnects these components. Signals outputted from the data sources 9 are inputted through the I/O port 7. The I/O port 7 includes various ports appropriate for various data types and communication formats, such as a serial input/output port, a parallel input/output port, a bit input/output port, and an analog input/output port.

In the embodiment, the primary controller 1 is formed of one CPU (so-called single core). The primary controller 1 may include a plurality of CPUs; any one CPU of the CPUs is assumed to perform a process described in conjunction with the embodiment.

The flash memory 3, which is a rewritable nonvolatile memory, stores various software programs such as an operating system (hereinafter referred to as the OS) 11. The configuration of software programs stored in the flash memory 3 will be described later with reference to FIG. 2.

The ROM 4 stores a program that loads the OS when, e.g., the primary controller 1 starts; namely, the ROM 4 functions as a boot ROM. As another example, some or all of the software programs stored in the flash memory 3 may alternatively be stored in the ROM 4.

The RAM 5 is used as a work area where the CPU 2 performs various computations based on programs stored in the flash memory 3. The RAM 5 includes storage areas that are individually allocated to the programs. The RAM 5 also includes later-described buffer memories (hereinafter referred to as the buffers) 5A-5C, 5N, 5M, 5P-5R.

Figure 2:
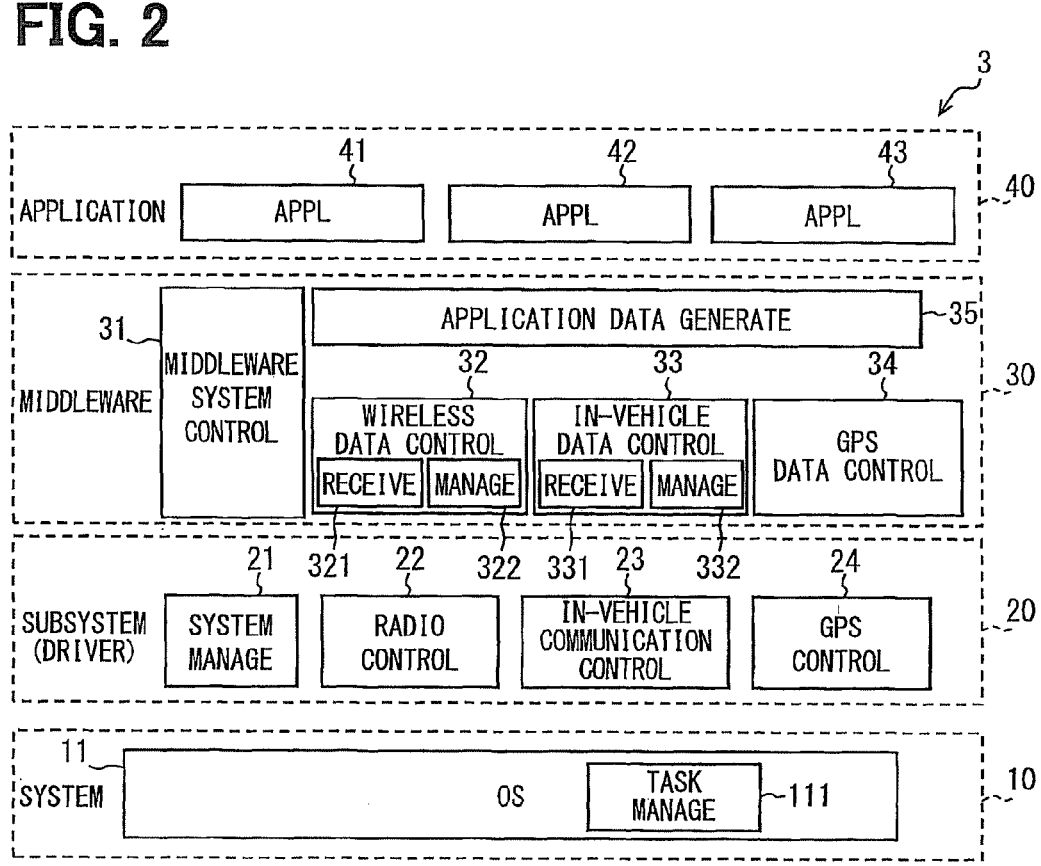
FIG. 2 is a schematic block diagram illustrating an exemplary software configuration of a primary controller according to the embodiment.

The configuration of software included in the primary controller 1 will now be described with reference to FIG. 2. As in FIG. 2, the software stored in the flash memory 3 has a hierarchical structure formed of a system layer 10, a subsystem layer 20, a middleware layer 30, and an application layer 40. As such, the system layer 10 is separated from the subsystem layer 20; meanwhile, the system layer 10 may incorporate the subsystem layer 20.

The system layer 10 stores the OS 11 of a well-known real-time OS, which manages not only processes (namely, tasks) performed by later-described sections 21-24, 31-35, 41-43 but also memory resources such as the RAM. Task management is exercised, e.g., to generate a task, select the task to be executed, and perform an interrupt process or a suspension process. Among various functions implemented by the OS 11, a function of exercising the task management is referred to as the task management section 111.

The task management section 111 exercises so-called prioritized task management, in which the task to be executed is determined based on the priority assigned to each task. Priorities assigned to individual tasks and operations performed by the task management section 111 will be described later with reference to FIGS. 5 and 6.

Besides, the OS 11 implements various functions such as a function of managing the communication between computers, a function of recovering from a failure in the primary controller 1, and a function of arbitrating data input/output requests that are issued from a plurality of tasks to the same input/output apparatus.

The subsystem layer 20 includes a system management section 21 and various device drivers. The system management section 21 manages, e.g., a shutoff process for electrical power to be supplied to the primary controller 1. The various device drivers serve the data sources 9 connected to the primary controller 1. More specifically, the subsystem layer 20 includes a radio control section 22, an in-vehicle communication control section 23, and a GPS control section 24. The radio control section 22 is a device driver for the radio 91. The in-vehicle communication control section 23 is a device driver for the in-vehicle communication microcomputer 92. The GPS control section 24 is a device driver for the GPS receiver 93. Operations performed by the radio control section 22, the in-vehicle communication control section 23, and the GPS control section 24 will be described in detail later with reference to FIG. 3.

The middleware layer 30 is positioned midway between the subsystem layer 20 and the application layer 40. The middleware layer 30 passes various data inputted from the individual data sources 9 to applications 41-43 in the application layer 40. More specifically, the middleware layer 30 includes a middleware system control section 31, a wireless data control section 32, an in-vehicle data control section 33, a GPS data control section 34, an application data generation section 35. The middleware system control section 31 controls the sections 32-35 in the middleware layer 30. The wireless data control section 32, the in-vehicle data control section 33, the GPS data control section 34, and the application data generation section 35 will be described with reference to FIG. 3.

The application layer 40 includes software, i.e., applications, for implementing various control processes such as the aforementioned ACC process and collision mitigation braking process. The application layer 40 includes an application 41 for implementing the ACC process, an application 42 for implementing the collision mitigation braking process, and an application 43 for implementing the LKA process. Applications for assuring increased driving safety are exemplified above as the applications incorporated in the primary controller 1. In contrast, an application for reducing fuel consumption and battery consumption may be additionally incorporated in the primary controller 1. The number and types of such applications may be determined as appropriate.

Figure 3:
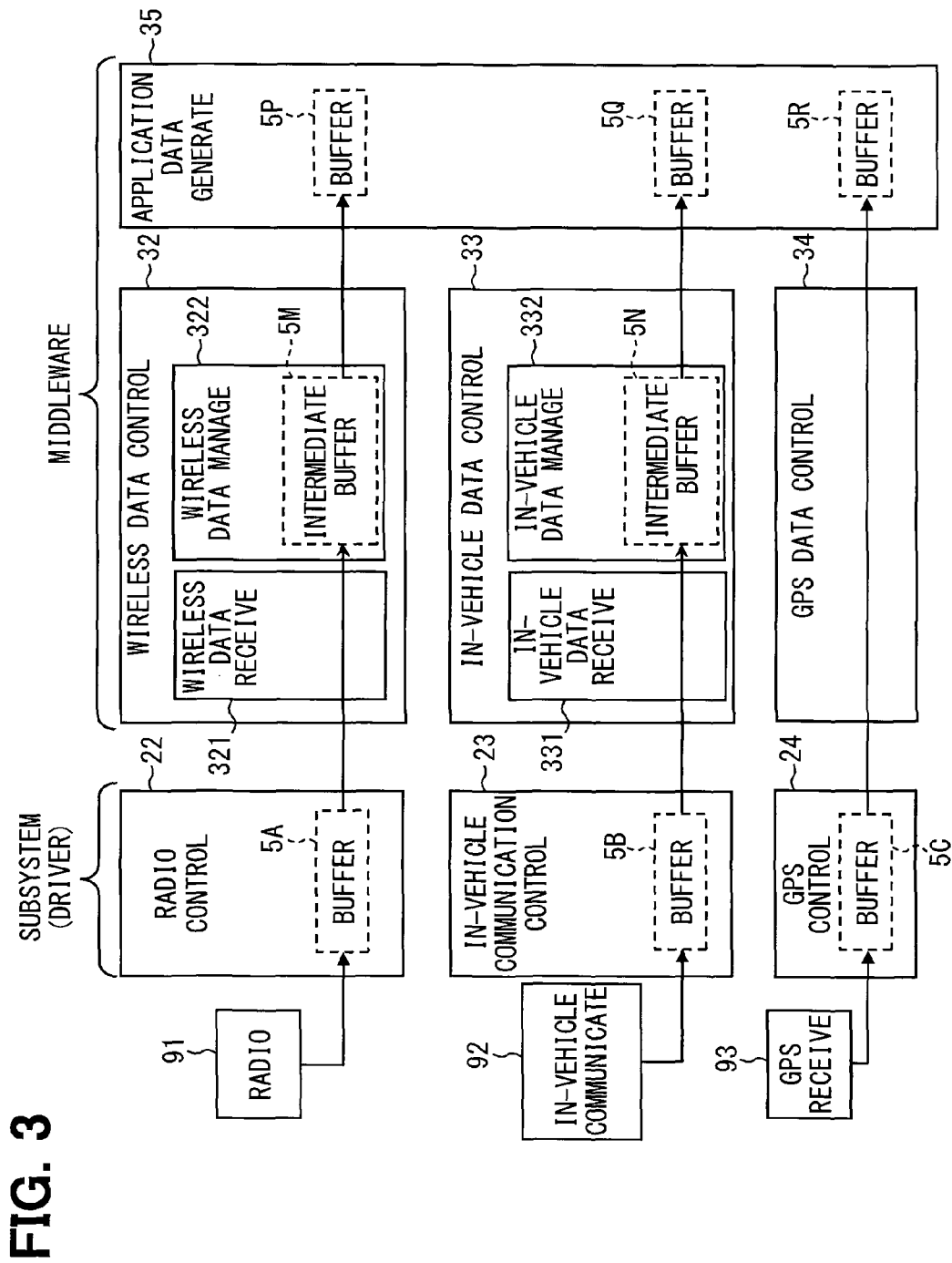
FIG. 3 is a diagram illustrating the sequence of wireless data, in-vehicle data, and GPS data.

The radio control section 22, the in-vehicle communication control section 23, the GPS control section 24, the wireless data control section 32, the in-vehicle data control section 33, the GPS data control section 34, and the application data generation section 35 will now be described with reference to FIG. 3. FIG. 3 illustrates the subsystem layer 20 and the middleware layer 30, which are depicted in FIG. 2. The system management section 21 and the middleware system control section 31, which are described earlier, are omitted from FIG. 3.

First of all, the radio control section 22 and the wireless data control section 32 will be sequentially described based on the sequence of wireless data received by the radio 91.

The radio control section 22, which is a device driver for the radio 91, receives wireless data inputted from the radio 91. The radio control section 22 then stores the received wireless data in a storage area 5A of the RAM 5 that is allocated as a buffer for the radio control section 22 (this storage area is referred to as the radio control section buffer). The radio control section buffer 5A is also referred to as the first wireless data storage unit. When wireless data is inputted from the radio 91, the radio control section 22 generates an event indicative of the reception of the wireless data (this event is referred to as the wireless data reception event) and transmits the generated event to the task management section 111.

The wireless data control section 32 is subdivided into functional blocks, namely, a wireless data reception section 321 and a wireless data management section 322. A storage area having a predetermined size is allocated in the RAM 5 as a buffer 5M for the wireless data control section 32 (this buffer is referred to as the wireless data intermediate buffer 5M). The wireless data intermediate buffer 5M is also referred to as the intermediate wireless data storage unit. In the embodiment, the wireless data management section 322 virtually includes the wireless data intermediate buffer 5M as depicted in FIG. 3.

The expression "the wireless data management section 322 virtually includes the wireless data intermediate buffer 5M" signifies that the wireless data management section 322 has the right to permit data stored in the wireless data intermediate buffer 5M to be deleted. Permitting the data to be deleted signifies deleting the data or permitting other data to overwrite a storage area where the data is stored. The RAM 5 is the hardware that actually includes the wireless data intermediate buffer 5M.

In the subsequent description, too, the expression "a functional section virtually includes a buffer" signifies that the function has the right to permit data stored in the buffer to be deleted. In any case, the RAM 5 is the hardware that actually implements the buffer.

In compliance with an instruction from the task management section 111, the wireless data reception section 321 moves wireless data stored in the radio control section buffer 5A to the wireless data intermediate buffer 5M. The wireless data stored in the radio control section buffer 5A is then deleted to free resources of the radio control section buffer 5A. When the wireless data stored in the radio control section buffer 5A is completely moved to the wireless data intermediate buffer 5M, the wireless data reception section 321 generates an event indicative of that completion of movement, and transmits the generated event to the task management section 111.

In compliance with an instruction from the task management section 111, the wireless data management section 322 collectively moves the wireless data stored in the wireless data intermediate buffer 5M to a wireless data buffer 5P that is virtually included in the application data generation section 35. The wireless data buffer 5P is a storage area that is allocated as a buffer for wireless data that is used in the RAM 5 by the application data generation section 35.

The RAM 5 includes an in-vehicle data buffer 5Q and a GPS data buffer 5R. The in-vehicle data buffer 5Q stores in-vehicle data that is used by the application data generation section 35. The GPS data buffer 5R stores GPS data that is used by the application data generation section 35. The in-vehicle data buffer 5Q and the GPS data buffer 5R are also virtually included in the application data generation section 35. The wireless data buffer 5P, the in-vehicle data buffer 5Q, and the GPS data buffer 5R are also referred to as the second wireless data storage unit, the second in-vehicle data storage unit, and the second separate data storage unit, respectively.

When moving the wireless data stored in the wireless data intermediate buffer 5M to the wireless data buffer 5P, the wireless data management section 322 makes a duplicate of the wireless data stored in the wireless data intermediate buffer 5M and stores the duplicate in the wireless data buffer 5P. When the duplicate is completely stored in the wireless data buffer 5P, the original data, which is stored in the wireless data intermediate buffer 5M and used as a source from which the duplicate is made, is permitted to be overwritten by other data.

In the above, although original data that is identical to the data stored at a data supply destination is still remaining at a data supply source, such original data remaining at the data supply source may be overwritten by other data. Even for such a case, the expression "moving the data" is used. The expression "moving the data" is also naturally applicable to the case where data at a data supply source is deleted when the data is stored at a data supply destination.

In other words, when data is moved or data stored in a buffer (data supply source) is moved to another buffer (move destination), it signifies that the data is stored at the move destination, and that a storage area where the data at the data supply source was stored is made available (that is, the resources are freed).

Next, the in-vehicle communication control section 23 and the in-vehicle data control section 33 will be sequentially described based on the sequence of in-vehicle data outputted from the in-vehicle communication microcomputer 92.

The in-vehicle communication control section 23, which is a device driver for the in-vehicle communication microcomputer 92, receives in-vehicle data inputted from the in-vehicle communication microcomputer 92. The in-vehicle communication control section 23 then stores the received in-vehicle data in a storage area 5B allocated as a buffer for the in-vehicle communication control section 23 in the RAM 5 (this buffer is referred to as the in-vehicle communication control section buffer 5B). The in-vehicle communication control section buffer 5B is also referred to as the first in-vehicle data storage unit. Further, when in-vehicle data is inputted from the in-vehicle communication microcomputer 92, the in-vehicle communication control section 23 generates an event indicative of the reception of the in-vehicle data (this event is referred to as the in-vehicle data reception event) and transmits the generated event to the task management section 111.

The in-vehicle data control section 33 is subdivided into functional blocks that are an in-vehicle data reception section 331 and an in-vehicle data management section 332. A storage area having a predetermined size is allocated in the RAM 5 as a buffer 5N for the in-vehicle data control section 33 (this buffer is referred to as the in-vehicle data intermediate buffer 5N). The in-vehicle data intermediate buffer 5N is virtually included in the in-vehicle data management section 332. The in-vehicle data intermediate buffer 5N is also referred to as the intermediate in-vehicle data storage unit.

In compliance with an instruction from the task management section 111, the in-vehicle data reception section 331 moves in-vehicle data stored in the in-vehicle communication control section buffer 5B to the in-vehicle data intermediate buffer 5N. The in-vehicle data stored in the in-vehicle communication control section buffer 5B is then deleted to free resources of the in-vehicle communication control section buffer 5B. When the in-vehicle data stored in the in-vehicle communication control section buffer 5B is completely moved to the in-vehicle data intermediate buffer 5N, the in-vehicle data reception section 331 generates an event indicative of that completion of movement, and transmits the generated event to the task management section 111.

In compliance with an instruction from the task management section 111, the in-vehicle data management section 332 collectively moves the in-vehicle data stored in the in-vehicle data intermediate buffer 5N to the in-vehicle data buffer 5Q that is virtually included in the application data generation section 35.

In the above instance, the in-vehicle data management section 332 makes a duplicate of the in-vehicle data stored in the in-vehicle data intermediate buffer 5N and stores the duplicate in the in-vehicle data buffer 5Q, as is the case with the wireless data management section 322. When the duplicate is completely stored in the in-vehicle data buffer 5Q, the original data stored in the in-vehicle data intermediate buffer 5N is permitted to be overwritten by other data.

In addition, the GPS control section 24 and the GPS data control section 34 will be described based on the sequence of GPS data outputted from the GPS receiver 93.

The GPS control section 24, which is a device driver for the GPS receiver 93, receives GPS data outputted from the GPS receiver 93. The GPS control section 24 then stores the received GPS data in a storage area 5C allocated as a buffer for the GPS control section 24 in the RAM 5 (this buffer is referred to as the GPS control section buffer 5C).

Upon receipt of the GPS data from the GPS receiver 93, the GPS control section 24 generates an event indicative of the reception of the GPS data (this event is referred to as the GPS data reception event) and transmits the generated event to the task management section 111. The GPS control section 24 is also referred to as the separate data source control section. The GPS control section buffer 5C is also referred to as the first separate data storage unit.

In compliance with an instruction from the task management section 111, the GPS data control section 34 moves the GPS data stored in the GPS control section buffer 5C to the GPS data buffer 5R that is virtually included in the application data generation section 35. The GPS data stored in the GPS control section buffer 5C is then deleted to free resources of the GPS control section buffer 5C. The GPS data control section 34 is also referred to as the separate data control section.

Based on different types of data stored in the buffers 5P-5R virtually included in the application data generation section 35, the application data generation section 35 generates application data, that is, data required for the applications 41-43, at predetermined intervals (referred to as the data generation intervals). The generated application data is passed to the applications 41-43. The application data is also referred to as the control data. The application data generation section 35 is also referred to as the control data generation section.

The data generation intervals are assumed to be 100 ms although they vary with the applications in the application layer 40. In order to generate the application data at the data generation intervals, the application data generation section 35 generates an event requesting the generation of the application data (this event is referred to as the application data generation event) and outputs the generated event to the task management section 111. In compliance with an instruction from the task management section 111, the application data generation section 35 generates the application data.

Various tasks including a task for generating the application data (this task is referred to as the application data generation task) are sequentially executed based on priorities assigned to the individual tasks, as described later. Therefore, if any other existing task is given higher priority than the application data generation task, the application data generation task is not always executed at the exact data generation intervals.

The application data includes data indicative of a vehicle-to-vehicle distance between a preceding vehicle and the host vehicle and host vehicle location data indicative of the latitude and longitude of the host vehicle. The host vehicle location data indicates a location that is calculated from a combination, e.g., of GPS data, a traveled distance calculated by integrating the traveling speed, and the traveling direction determined by integrating an angular acceleration. The host vehicle location data may be generated at intervals shorter than the data generation intervals for the other application data in order to achieve adequate autonomous navigation computation accuracy.

Figure 4:
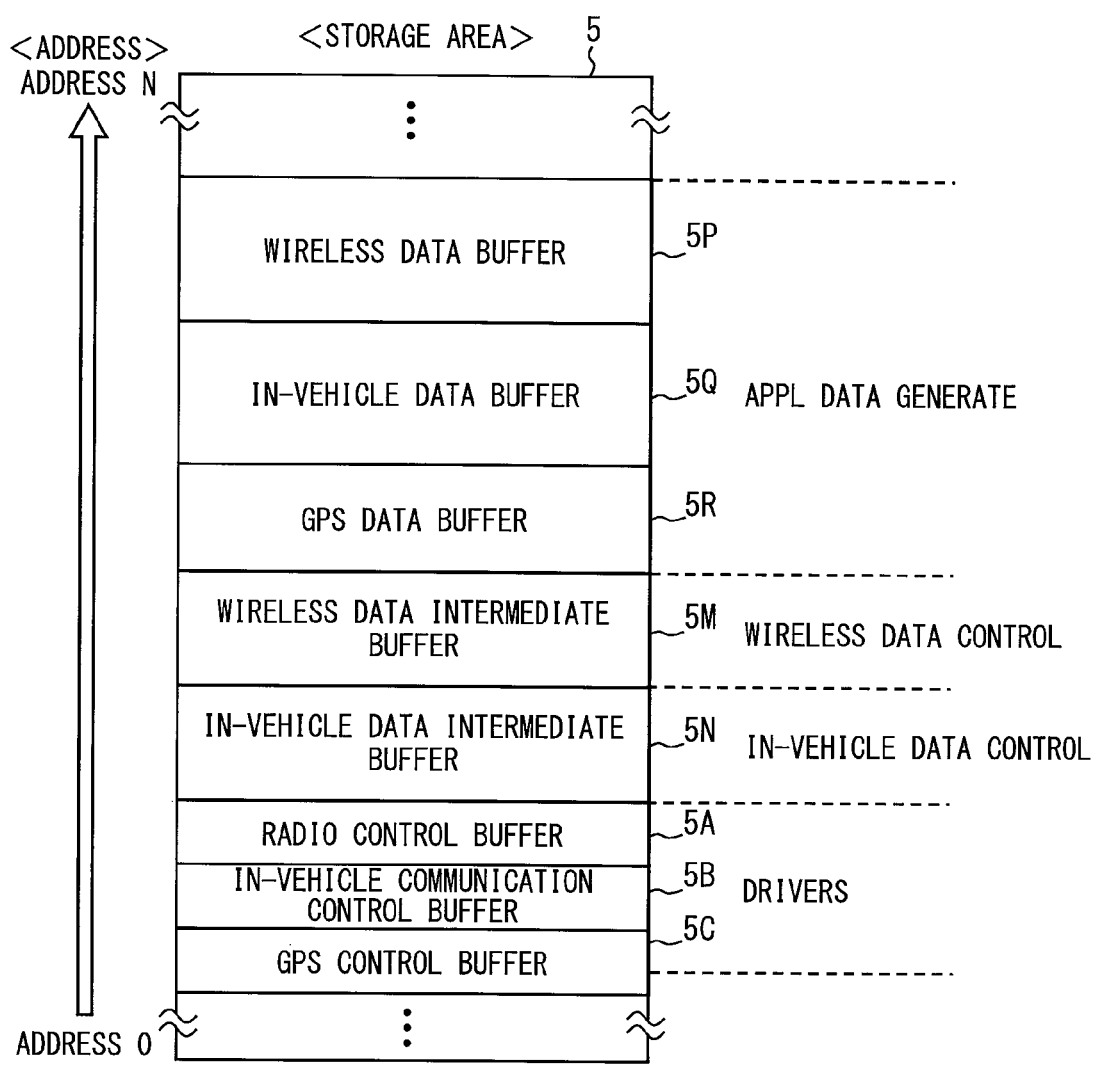
FIG. 4 is a conceptual block diagram illustrating a configuration of buffers allocated to a RAM.

The buffers in the RAM 5 will now be described with reference to FIG. 4. FIG. 4 is a conceptual diagram illustrating a storage area implemented by the RAM 5. Memory addresses in the RAM 5 are from 0 to N (N is an integer). As described earlier, the RAM 5 includes various buffers 5A-5C, 5N, 5M, 5P-5R. The vertical length of a storage area representing a buffer conceptually indicates the storage capacity (that is, the size) of the buffer. More specifically, the greater the vertical length, the larger the size.

The buffers illustrated in FIG. 4 are contiguously disposed in a storage area. However, the buffers need not always be contiguously disposed. A computation area for a different use may be disposed between the buffers. Further, the buffers need not always be arranged in the order indicated in FIG. 4.

That is, the buffers should be disposed in different area of the storage area, and may be positioned at any place (address) and arranged in any order. Here, it is assumed that the wireless data buffer 5P, the in-vehicle data buffer 5Q, and the GPS data buffer 5R, which are virtually included in the application data generation section 35, are independent buffers. Alternatively, some or all of such buffers may be combined.

In general, a buffer allocated to a device driver is smaller in size than a buffer allocated to a program that is positioned in a higher layer within a software system, such as the middleware layer 30 and the application layer 40. In the embodiment, too, the radio control section buffer 5A, the in-vehicle communication control section buffer 5B, and the GPS control section buffer 5C are smaller in size than the buffers 5P-5R allocated to the application data generation section 35, as in FIG. 4.

The size of the wireless data intermediate buffer 5M is set based on the amount of data inputted from the radio 91 to the primary controller 1 per unit time and on the data generation intervals. As an example, the size of the wireless data intermediate buffer 5M in the embodiment is equivalent to the maximum amount of data inputted from the radio 91 to the primary controller 1 during two of the data generation intervals (that is, during a period of 200 ms).

The size of the wireless data intermediate buffer 5M is not limited to the above and is acceptable as far as it is not smaller than the amount of data inputted from the radio 91 to the primary controller 1 during one of the data generation intervals. The embodiment uses a maximum possible value indicating the amount of data inputted from the radio 91 to the primary controller 1 per unit time. An alternative is to use, e.g., an average value derived from various tests.

The size of the in-vehicle data intermediate buffer 5N is set based on the amount of data inputted from the in-vehicle communication microcomputer 92 to the primary controller 1 per unit time. As an example, the embodiment uses the maximum amount of data inputted from the in-vehicle communication microcomputer 92 to the primary controller 1 during two of the data generation intervals (during a period of 200 ms). In other words, the embodiment uses a value that is obtained by multiplying the maximum speed of communication between the in-vehicle communication microcomputer 92 and the primary controller 1 by a period of time equivalent to two of the data generation intervals. The size of the in-vehicle data intermediate buffer 5N may be set in a different manner, as is the case with the wireless data intermediate buffer 5M.

The size of the wireless data buffer 5P is acceptable as far as it is not smaller than the size of the wireless data intermediate buffer 5M. The size of the in-vehicle data buffer 5Q is acceptable as far as it is not smaller than the size of the in-vehicle data intermediate buffer 5N. The size of the GPS data buffer 5R is acceptable as far as it is not smaller than the size of the GPS control section buffer 5C.

Priorities assigned to tasks executed by the sections 31-35 included in the middleware layer 30 will now be described with reference to FIG. 5. FIG. 5 illustrates the priorities assigned to the tasks executed by functional sections indicated in the execution section field. The smaller the numerical value in the priority field, that is, the higher the position in the table in FIG. 5, the higher the priorities. The tasks are generated by the task management section 111. Upon receipt of an event from a section in the primary controller 1, the task management section 111 generates a task relevant to the event. A task generation process performed by the task management section 111 will be described later with reference to FIG. 6.

A middleware system control task having the highest priority controls the overall operation of the primary controller 1 and is executed by the middleware system control section 31. The middleware system control task, e.g., terminates or cancels a task that is being executed or on standby for execution by a section 32-35, and permits the primary controller 1 to turn off safely.

If an event indicative of system shutdown is received from the system management section 21, the task management section 111 generates the middleware system control task and causes the middleware system control section 31 to execute the middleware system control task.

The middleware system control section 31 transmits a termination notification to the sections 32-35, 41-43 in the middleware layer 30 or the application layer 40. Upon receipt of the termination notification, the sections terminate or cancel a task that is being executed or on standby for execution. Subsequently, when no more tasks are being executed or on standby for execution, the middleware system control section 31 transmits an event indicative of the completion of the middleware system control task to the task management section 111. When the primary controller 1 is permitted in the above manner to turn off safely, the system management section 21 turns off the primary controller 1.

Basically, the middleware system control task is not executed except when an operation of the primary controller 1 is to be started or terminated. During an operation of the primary controller 1, therefore, only later-described tasks are basically executed; namely, a task having the second highest priority is substantially given the highest priority during an operation of the primary controller 1.

A wireless data reception task having the second highest priority causes the wireless data reception section 321 to move wireless data stored in the radio control section buffer 5A to the wireless data intermediate buffer 5M, which is virtually included in the wireless data management section 322. An in-vehicle data reception task having the third highest priority causes the in-vehicle data reception section 331 to move in-vehicle data stored in the in-vehicle communication control section buffer 5B to the in-vehicle data intermediate buffer 5N, which is virtually included in the in-vehicle data management section 332.

An in-vehicle data management task having the fourth highest priority causes the in-vehicle data management section 332 to move in-vehicle data stored in the in-vehicle data intermediate buffer 5N to the in-vehicle data buffer 5Q. A GPS data management task having the fifth highest priority causes the GPS data control section 34 to move GPS data stored in the GPS control section buffer 5C to the GPS data buffer 5R.

A wireless data management task having the sixth highest priority causes the wireless data management section 322 to move wireless data stored in the wireless data intermediate buffer 5M to the wireless data buffer 5P. An application data generation task having the seventh highest priority causes the application data generation section 35 to generate application data based on wireless data, in-vehicle data, and GPS data stored in the buffers 5P-5R and supply the generated application data to the applications 41-43.

The task generation process performed by the task management section 111 will now be described with reference to the flowchart of FIG. 6. The flowchart starts when the task management section 111 receives an event.

In Step S101, the task management section 111 generates a task relevant to the received event. Upon completion of Step S101, processing proceeds to Step S103. If the wireless data reception event is received from the radio control section 22, the task management section 111 generates the wireless data reception task. If the in-vehicle data reception event is received from the in-vehicle communication control section 23, the task management section 111 generates the in-vehicle data reception task. If the GPS data reception event is received from the GPS control section 24, the task management section 111 generates the GPS data management task.

If an event indicative of the completion of the wireless data reception task is received, the task management section 111 generates the wireless data management task. If an event indicative of the completion of the in-vehicle data reception task is received, the task management section 111 generates the in-vehicle data management task. If the application data generation event is received, the task management section 111 generates the application data generation task.

In Step S103, the task management section 111 compares the priority assigned to the task generated in Step S101 (this task is referred to as the new task) against the priority assigned to a currently executed task. If the new task has higher priority than the currently executed task, the query in Step S103 is answered "YES" and processing proceeds to Step S105. If, by contrast, the new task has lower priority than the currently executed task, the query in Step S103 is answered "NO" and processing proceeds to Step S107.

As above, the task management section 111 in the embodiment uses the combination of a priority scheme and a first-come, first-served (FCFS) scheme to select the task to be executed. More specifically, tasks are sequentially executed in priority order, and if a plurality of tasks have the same priority, a task placed in a ready state earlier than the others takes precedence. Even if there is no currently executed task, the query in Step S103 is answered "YES".

In Step S105, the task management section 111 interrupts the currently executed task and executes the new task (performs a so-called dispatch). The interrupted task is then placed in the ready state, and necessary data is retained so as to resume the interrupted task later at the point of interruption. In Step S107, the new task is placed in the ready state.

Subsequently, when the currently executed task terminates, the task management section 111 executes a task having the highest priority among those in the ready state. In this instance, even if there is a task interrupted in Step S103, the task management section 111 executes a task that is given higher priority than the interrupted task and placed in the ready state.

Aspects of the Embodiment

In the above-described configuration, the wireless data reception section 321 moves the wireless data stored in the radio control section buffer 5A to the wireless data intermediate buffer 5M. Further, the in-vehicle data reception section 331 moves the in-vehicle data stored in the in-vehicle communication control section buffer 5B to the in-vehicle data intermediate buffer 5N.

Here, the wireless data reception task takes precedence over the in-vehicle data reception task, the GPS data management task, and various other data movement processes. That is, the wireless data received by the radio control section 22 is moved to the wireless data intermediate buffer 5M as soon as it is stored in the radio control section buffer 5A.

This reduces the possibility of the radio control section buffer 5A being filled with wireless data; namely, this reduces the possibility of losing the wireless data due to a full radio control section buffer 5A.

Among the various data movement processes, the in-vehicle data reception task takes precedence next to the wireless data reception task. More specifically, the in-vehicle data reception task takes precedence over the GPS data management task and the in-vehicle data management task.

Thus, if the wireless data is not received by the radio control section 22, the in-vehicle data received by the in-vehicle communication control section 23 and stored in the in-vehicle communication control section buffer 5B is successively moved to the in-vehicle data intermediate buffer 5N. Therefore, the in-vehicle communication control section buffer 5B is also unlikely to be filled. This reduces the possibility of discarding the in-vehicle data due to a full in-vehicle communication control section buffer 5B.

Further, the wireless data management task is given lower priority than the wireless data reception task. This ensures that the wireless data management task is executed with a relatively low frequency. Thus, the wireless data tends to accumulate in the wireless data intermediate buffer 5M. In contrast, the wireless data intermediate buffer 5M is sized based on the amount of data inputted to the radio control section 22 during a data generation interval. Therefore, the wireless data intermediate buffer 5M is unlikely to be filled. This reduces the possibility of losing the wireless data due to a full wireless data intermediate buffer 5M.

Similarly, the in-vehicle data management task is given lower priority than the in-vehicle data reception task. However, the in-vehicle data intermediate buffer 5N is sized based on the amount of data inputted to the in-vehicle communication control section 23 during a data generation interval. This reduces the possibility of losing the in-vehicle data due to a full in-vehicle data intermediate buffer 5N.

The wireless data and the in-vehicle data are received in a larger amount per unit time than, e.g., the GPS data. Thus, the above-described configuration reduces the possibility of discarding the wireless data and in-vehicle data due to a full buffer. This increases the reliability of communication of both the wireless data and the in-vehicle data.

Another solution for reducing the possibility of losing the individual data due to the fullness of the buffer 5A, 5B would be to change the design of the radio control section 22 and the in-vehicle communication control section 23 so as to allocate the radio control section buffer 5A and in-vehicle communication control section buffer 5B that are larger in size.

However, software is designed to have a hierarchical structure and provide a component for each function. In this manner, the software is capable of serving various applications and being updated on an individual hierarchical level basis or an individual component basis. The software should preferably be configured so that the software included in the subsystem layer 20, which is a relatively low layer, is capable of serving various applications.

Such software scalability and updatability leads to a demand to avoid designing a component (i.e., a device driver) included in the subsystem layer 20 exclusively for a particular application. More specifically, the demand is to avoid the use of a configuration that changes the sizes of buffers for the radio control section 22 and the in-vehicle communication control section 23.

The embodiment permits the sections 32, 33 of the middleware layer 30, which is positioned midway between the subsystem layer 20 and the application layer 40, to provide intermediate buffers appropriate for applications. When such a configuration is employed, the software is not changed at the level of the subsystem layer 20. Therefore, the above-described effect can be achieved without impairing the software scalability and updatability The tasks in the above-described example, in order of priority from highest to lowest, are the wireless data reception task, the in-vehicle data reception task, the in-vehicle data management task, the GPS data management task, the wireless data management task, and the application data generation task. The order of priority need not be limited to the above.

The tasks in an alternative example, in order of priority from highest to lowest, may be the wireless data reception task, the wireless data management task, the in-vehicle data reception task, the in-vehicle data management task, the GPS data management task, and the application data generation task. The tasks in another alternative example, in order of priority from highest to lowest, may be the wireless data reception task, the in-vehicle data reception task, the wireless data management task, the in-vehicle data management task, the GPS data management task, and the application data generation task.

The priorities assigned to the individual tasks are acceptable as far as the wireless data reception task has higher priority than the in-vehicle data reception task and the wireless data reception task has higher priority than the wireless data management task. As mentioned earlier, it is more preferable that the wireless data reception task be given higher priority than the in-vehicle data reception task, and that the in-vehicle data reception task be given higher priority than the in-vehicle data management task.

Further, the embodiment describes the GPS data as data used for control process other than the in-vehicle data indicative of the internal status of the host vehicle, and the wireless data indicative of the periphery status of the host vehicle. An alternative is to additionally use data indicative of the physical condition of a user. Note that the GPS data is not an essential element.

Moreover, the embodiment permits the primary controller 1 to receive the in-vehicle data, which is outputted from the in-vehicle instruments, through the in-vehicle communication microcomputer 92. The embodiment need not be limited thereto. Alternatively, the in-vehicle instruments may directly input the in-vehicle data to the primary controller 1. The in-vehicle instruments need not always be disposed outside the primary controller 1, but may be, e.g., sensors disposed in a housing of the primary controller 1.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An electronic control apparatus that is mounted in a vehicle and used to perform a control process based on wireless data and in-vehicle data, the wireless data being received by a radio that establishes wireless communication with at least either a different vehicle or a roadside unit, the in-vehicle data being generated by an in-vehicle instrument disposed in the vehicle, the electronic control apparatus comprising:
- a radio control section that stores the wireless data inputted from the radio in a first wireless data storage unit;
- an in-vehicle communication control section that stores the in-vehicle data inputted from the in-vehicle instrument in a first in-vehicle data storage unit;
- a wireless data control section that stores the wireless data stored in the first wireless data storage unit in a second wireless data storage unit;
- an in-vehicle data control section that stores the in-vehicle data stored in the first in-vehicle data storage unit in a second in-vehicle data storage unit; and
- a control data generation section that generates control data, which is necessary for performing the control process, from the wireless data stored in the second wireless data storage unit and the in-vehicle data stored in the second in-vehicle data storage unit, wherein:
the wireless data control section includes
- a wireless data reception section that moves the wireless data stored in the first wireless data storage unit to an intermediate wireless data storage unit, and
- a wireless data management section that moves the wireless data stored in the intermediate wireless data storage unit to the second wireless data storage unit;

the in-vehicle data control section includes an in-vehicle data reception section that moves the in-vehicle data stored in the first in-vehicle data storage unit to an intermediate in-vehicle data storage unit; and a process performed by the wireless data reception section takes precedence over a process performed by the in-vehicle data reception section and over a process performed by the wireless data management section.

2. The electronic control apparatus according to claim 1, wherein:
the in-vehicle data control section further includes an in-vehicle data management section that moves the in-vehicle data stored in the intermediate in-vehicle data storage unit to the second in-vehicle data storage unit; and
a process performed by the in-vehicle data reception section takes precedence over a process performed by the in-vehicle data management section.

3. The electronic control apparatus according to claim 1, wherein:
the control data generation section generates the control data at a predetermined interval; and
the intermediate wireless data storage unit has a storage capacity that is determined based on the predetermined interval and an amount of data inputted per unit time from the radio to the radio control section,
the storage capacity being equal to or greater than an amount of data inputted from the radio to the radio control section during the predetermined interval.

4. The electronic control apparatus according to claim 3, wherein
the intermediate in-vehicle data storage unit has a storage capacity that is determined based on the predetermined interval and an amount of data inputted per unit time from the in-vehicle instrument to the in-vehicle communication control section,
the storage capacity being equal to or greater than an amount of data inputted from the in-vehicle instrument to the in-vehicle communication control section during the predetermined interval.

5. An electronic control apparatus that is mounted in a vehicle and used to perform a control process based on wireless data and in-vehicle data, the wireless data being received by a radio that establishes wireless communication with at least either a different vehicle or a roadside unit, the in-vehicle data being generated by an in-vehicle instrument disposed in the vehicle, the electronic control apparatus comprising:
- a radio control section that stores the wireless data inputted from the radio in a first wireless data storage unit;
- an in-vehicle communication control section that stores the in-vehicle data inputted from the in-vehicle instrument in a first in-vehicle data storage unit;
- a wireless data control section that stores the wireless data stored in the first wireless data storage unit in a second wireless data storage unit;
- an in-vehicle data control section that stores the in-vehicle data stored in the first in-vehicle data storage unit in a second in-vehicle data storage unit; and
- a control data generation section that generates control data, which is necessary for performing the control process, from the wireless data stored in the second wireless data storage unit and the in-vehicle data stored in the second in-vehicle data storage unit, wherein:
the wireless data control section includes
- a wireless data reception section that moves the wireless data stored in the first wireless data storage unit to an intermediate wireless data storage unit, and
- a wireless data management section that moves the wireless data stored in the intermediate wireless data storage unit to the second wireless data storage unit;

the in-vehicle data control section includes an in-vehicle data reception section that moves the in-vehicle data stored in the first in-vehicle data storage unit to an intermediate in-vehicle data storage unit; and a process performed by the wireless data reception section takes precedence over a process performed by the in-vehicle data reception section and over a process performed by the wireless data management section wherein:
the electronic control apparatus performs a control process based on a plurality of different types of data including the wireless data and the in-vehicle data;
the electronic control apparatus includes
- a separate data source control section that stores separate data in a first separate data storage unit, the separate data being inputted from a separate data source, the separate data being the different types of data other than the wireless data and the in-vehicle data, and
- a separate data control section that stores the separate data stored in the first separate data storage unit in a second separate data storage unit; and the control data generation section generates the control data from the wireless data stored in the second wireless data storage unit, the in-vehicle data stored in the second in-vehicle data storage unit, and the separate data stored in the second separate data storage unit.

6. The electronic control apparatus according to claim 5, wherein
each of a process performed by the wireless data reception section and a process performed by the in-vehicle data reception section both takes precedence over a process performed by the separate data control section.

7. The electronic control apparatus according to claim 5, wherein processes by the radio control section, the in-vehicle communication control section, the separate data source control section, the wireless data control section, the in-vehicle data control section, and the separate data control section are all executed by a single CPU.

8. The electronic control apparatus according to claim 5, wherein:
the in-vehicle data control section further includes an in-vehicle data management section that moves the in-vehicle data stored in the intermediate in-vehicle data storage unit to the second in-vehicle data storage unit; and
a process performed by the in-vehicle data reception section takes precedence over a process performed by the in-vehicle data management section.

9. The electronic control apparatus according to claim 5, wherein:
the control data generation section generates the control data at a predetermined interval; and
the intermediate wireless data storage unit has a storage capacity that is determined based on the predetermined interval and an amount of data inputted per unit time from the radio to the radio control section,
the storage capacity being equal to or greater than an amount of data inputted from the radio to the radio control section during the predetermined interval.

10. The electronic control apparatus according to claim 9, wherein
the intermediate in-vehicle data storage unit has a storage capacity that is determined based on the predetermined interval and an amount of data inputted per unit time from the in-vehicle instrument to the in-vehicle communication control section,
the storage capacity being equal to or greater than an amount of data inputted from the in-vehicle instrument to the in-vehicle communication control section during the predetermined interval.

11. An electronic control apparatus that is mounted in a vehicle and used to perform a control process based on wireless data and in-vehicle data, the wireless data being received by a radio that establishes wireless communication with at least either a different vehicle existing external to the vehicle or a roadside unit existing external to the vehicle, the in-vehicle data being generated by an in-vehicle instrument disposed internally in the vehicle, the electronic control apparatus comprising:
a radio control section that stores the wireless data inputted from the radio in a first wireless data storage unit;
an in-vehicle communication control section that stores the in-vehicle data inputted from the in-vehicle instrument in a first in-vehicle data storage unit;
a wireless data control section that stores the wireless data stored in the first wireless data storage unit in a second wireless data storage unit;
an in-vehicle data control section that stores the in-vehicle data stored in the first in-vehicle data storage unit in a second in-vehicle data storage unit; and
a control data generation section that generates control data, which is necessary for performing the control process, from the wireless data stored in the second wireless data storage unit and the in-vehicle data stored in the second in-vehicle data storage unit,
wherein
the wireless data control section includes
a wireless data reception section that performs a first process that moves the wireless data stored in the first wireless data storage unit to an intermediate wireless data storage unit, and
a wireless data management section that performs a second process that moves the wireless data stored in the intermediate wireless data storage unit to the second wireless data storage unit;
the in-vehicle data control section includes
an in-vehicle data reception section that performs a third process that moves the in-vehicle data stored in the first in-vehicle data storage unit to an intermediate in-vehicle data storage unit;
the first wireless data storage unit, the first in-vehicle data storage unit, the second wireless data storage unit, the second in-vehicle data storage unit, the intermediate wireless data storage unit, and the intermediate in-vehicle data storage unit are disposed differently from each other; and
the first process performed by the wireless data reception section takes precedence over the third process performed by the in-vehicle data reception section and, simultaneously, the first process performed by the wireless data reception section takes precedence over the second process performed by the wireless data management section.

12. The electronic control apparatus according to claim 11, wherein:
the in-vehicle data control section further includes an in-vehicle data management section that performs a fourth process that moves the in-vehicle data stored in the intermediate in-vehicle data storage unit to the second in-vehicle data storage unit; and
the first process performed by the in-vehicle data reception section takes precedence over the fourth process performed by the in-vehicle data management section.

13. The electronic control apparatus according to claim 11, wherein:
the control data generation section generates the control data at a predetermined interval; and
the intermediate wireless data storage unit has a storage capacity that is determined based on the predetermined interval and an amount of data inputted per unit time from the radio to the radio control section,
the storage capacity being equal to or greater than an amount of data inputted from the radio to the radio control section during the predetermined interval.

14. The electronic control apparatus according to claim 13, wherein
the intermediate in-vehicle data storage unit has a storage capacity that is determined based on the predetermined interval and an amount of data inputted per unit time from the in-vehicle instrument to the in-vehicle communication control section,
the storage capacity being equal to or greater than an amount of data inputted from the in-vehicle instrument to the in-vehicle communication control section during the predetermined interval.

15. The electronic control apparatus according to claim 11, wherein:
the electronic control apparatus performs a control process based on a plurality of different types of data including the wireless data and the in-vehicle data;
the electronic control apparatus includes
a separate data source control section that stores separate data in a first separate data storage unit, the separate data being inputted from a separate data source, the separate data being the different types of data other than the wireless data and the in-vehicle data, the separate data being data acquired from a satellite via an in-vehicle receiver to provide a current location of the vehicle, and a separate data control section that performs a fifth process that stores the separate data stored in the first separate data storage unit in a second separate data storage unit; and the control data generation section generates the control data from the wireless data stored in the second wireless data storage unit, the in-vehicle data stored in the second in-vehicle data storage unit, and the separate data stored in the second separate data storage unit.

16. The electronic control apparatus according to claim 15, wherein each of the first process performed by the wireless data reception section and the third process performed by the in-vehicle data reception section both takes precedence over the fifth process performed by the separate data control section.

17. The electronic control apparatus according to claim 15, wherein processes by the radio control section, the in-vehicle communication control section, the separate data source control section, the wireless data control section, the in-vehicle data control section, and the separate data control section are all executed by a single CPU.

* * * * *